Patented June 16, 1936

2,044,722

UNITED STATES PATENT OFFICE 2,044,722

MANUFACTURE OF LUBRICATING OIL

Francis X. Govers, Vincennes, Ind., assignor to Indian Refining Company, Lawrenceville, Ind., a corporation of Maine No Drawing. Application March 13, 1934, Serial No. 715,299

6 Claims. (Cl. 196—17)

This invention relates to the manufacture of lubricating oil from hydrocarbon oils, and more particularly to the manufacture of high viscosity index low pour test lubricating oil from wax-bearing mineral oils.

Broadly, the invention contemplates the treatment of hydrocarbon oils, particularly paraffin-bearing lubricating fractions of petroleum, with solvents to selectively produce therefrom low pour test lubricating oils characterized by having a desired viscosity temperature relationship and improved lubricating qualities.

The present invention comprises dewaxing and extracting wax-bearing mineral oil with liquid sulphur dioxide and a modifying solvent liquid selected from the aliphatic alcohols of the amyl group.

In carrying out my invention, wax-bearing mineral oil is mixed with liquid sulphur dioxide and an aliphatic alcohol, such as amyl alcohol or a mixture of various isomers of amyl alcohol such as commercial amyl alcohol boiling from about 241° F. to 277° F., in such ratio to each other and to the oil that upon chilling to around 0° F. or below and removing the precipitated wax and the solvent liquids, the oil has a pour test substantially the same as, or even lower than, the chilling temperature. With complete mixing, the resulting mixture is chilled to precipitate the wax constituents and the wax thus precipitated is removed in any suitable manner as by filtering, settling or centrifuging.

To the dewaxed mixture additional liquid sulphur dioxide is added, the ratio of liquid sulphur dioxide to amyl alcohol being increased for the purpose of extracting from the mixture hydrocarbon constituents of the so-called naphthenic type, characterized by having a heavy specific gravity and a low viscosity index. The temperature and pressure at which this extraction is carried out, and the ratio of the solvent liquids to each other and to the oil, may be varied as required in order to effect the particular degree of separation desired.

After removal of the heavy, low viscosity index fraction, the remaining relatively high viscosity index oil is separated into fractions of differing viscosity index by the addition of further quantities of the solvent liquids to the remaining oil and solvent mixture. In this instance, the ratio of the solvent liquids to each other, as well as to the oil, may be either increased or decreased, depending upon the nature of the separation or fractionation desired. Any suitable treating temperature or pressure may also be selected for the purpose of facilitating or modifying the separation, as in the case of the initial extraction of the relatively low viscosity index constituents.

I have found that by the process herein disclosed lubricating oils of any desired viscosity index and scale of purification, coupled with low pour test, can be made from mixed base or paraffin base crude, and the oils so produced are characterized further by low carbon residue and low sulphur content. The obtaining of oils having these desired qualities does not depend on methods involving redistillation or acid treatment. The oils obtained by my process require no refining with sulphuric acid with its attendant undesirable high losses in valuable lubricating oil constituents as well as its consequent production of difficultly disposable acid sludge.

By way of example and for the purpose of illustration, I will now describe the operation of my invention in connection with the purification of an untreated wax distillate obtained by vacuum distillation of a Mid-Continent crude of the Oklahoma type and having the following characteristics:

Gravity ° Baumé _____ 24.0
Saybolt Universal viscosity at 210° F _____ 65
Pour point ° F _____ 85
Percent sulphur _____ .2

This distillate is mixed with a solvent liquid mixture in the proportion of about one part of wax-bearing oil to about three parts of solvent liquid, the solvent liquid mixture comprising about 25% of liquid sulphur dioxide and 75% of commercial amyl alcohol. The resulting mixture is well stirred to obtain complete mixing and chilled to about −18° F. to precipitate wax.

The chilled mixture, containing suspended wax, is then introduced to filtering means wherein the precipitated wax or solid hydrocarbons are separated from the liquid to produce a filter cake and a filtrate containing low pour test oil.

If desired, the filtration may be carried out in the presence of a filter-aid material advantageously of the diatomaceous earth type.

The filter cake in the press is washed with fresh solvent liquid of substantially the same composition as that originally mixed with the wax-bearing oil. The washing may be carried out at substantially the same temperature as that maintained during chilling and filtering. The resulting solvent wash, which contains an appreciable quantity of dissolved oil removed from the filter cake, is advantageously used as part of the solvent liquid in mixing with the succeeding batch of fresh wax-bearing oil, allowance being made for the dissolved oil contained therein.

After the washing step, the filter cake is removed from the press and subjected to further treatment, as may be desired, for the recovery of wax therefrom. The wax obtained from the cake, after removal of the solvent and after contacting with clay, will be white and have a melting point, without sweating, of approximately 138° F.

Additional quantities of solvent liquid sulphur dioxide are added to the dewaxed filtrate to alter the percentage composition of liquid sulphur dioxide to modifying solvent. The solvent liquid mixture advantageously could be altered to comprise about 50% liquid sulphur dioxide and about 50% commercial amyl alcohol, and the liquid mixture after the addition of the liquid sulphur dioxide would be approximately 6 parts solvent liquid mixture to 1 part of dewaxed oil.

This mixture is then completely mixed and chilled to about 0° F., following which it is allowed to settle and separate into two layers, the lower layer or fraction comprising the naphthenic type bodies characterized by having a low viscosity index and a heavy specific gravity of around 11.6° Bé.

The top layer obtained in the preceding separation and designated as fraction "A", is then mixed with two volumes of a mixture of equal parts of liquid sulphur dioxide and amyl alcohol. The mixture is thoroughly stirred and chilled to about 0° F. and then allowed to settle and separate into an upper and a lower layer. The ratio of liquid sulphur dioxide to amyl alcohol used in this instance may be varied, depending on the fractionation desired.

After recovering the solvent liquid from each of these layers, and separately contacting the remaining oil with about 20 pounds of clay per barrel of oil in the presence of steam and at temperatures up to about 500° F. and filtering, the resulting fractions of oil will have the following characteristics:

|  | Upper layer | Lower layer |
| --- | --- | --- |
| Gravity ° Baumé | 29.1 | 25.2 |
| Saybolt Universal viscosity at 210° F | 68 | 74 |
| Pour point °F | −10 | −10 |
| Per cent sulphur | .01 | .1 |
| Per cent carbon residue | .048 | .2 |
| Viscosity index | 98 | 80 |

However, instead of treating fraction "A" with equal parts of sulphur dioxide and amyl alcohol, the ratio of these added solvents may be substantially reversed as, for example, treating this fraction with three parts of liquid sulphur dioxide and two parts of amyl alcohol. In this case, the resulting lower layer, after removal of the solvent, will be of lower lubricating value, having a gravity of about 15° Baumé and, of course, correspondingly low viscosity index.

The resulting upper layer, after removal of the solvent, followed by clay treatment in the same manner as already described in connection with the preceding example, will have the following characteristics:

| | |
| --- | --- |
| Gravity ° Baumé | 27.0 |
| Saybolt Universal viscosity at 210° F | 70 |
| Pour point ° F | −15 |
| Percent sulphur | .1 |
| Percent carbon residue | .15 |
| Viscosity index | 87 |

The invention is not limited to the production of final products having the particular characteristics of those described above. Products of differing characteristics, as desired, may be prepared by varying the proportions of the solvent liquids and also the temperatures at which the treating steps are carried out.

Furthermore, the invention is not limited to the treatment of wax distillate such as given in the examples herein, but is adapted to the treatment of other paraffin-containing fractions, precipitates, wax concentrates or materials, somewhat similar in nature, derived in various ways from mineral oils.

Thus, my invention is applicable to the treatment of hydrogenation products resulting from the hydrogenation of carbonaceous materials, or mineral oils, including liquid or solid hydrocarbon fractions derived from mineral oils. Hydrogenation products may contain substantial quantities of waxy or paraffin material as well as other constituents of relatively low lubricating value. By treating such products in accordance with my invention, final products of desired characteristics can be obtained.

In the appended claims by the expression "amyl alcohol" I intend to include a commercial mixture of amyl alcohols boiling from 241° F. to 277° F., such as produced commercially by chlorination of pentane, or the fusel oil of commerce produced by fermentation and boiling within this temperature range.

Obviously many modifications and variations of the invention, as hereinbefore set forth, may be made without departing from the spirit and scope thereof, and therefore only such limitations should be imposed as are indicated in the appended claims.

I claim:

1. In the manufacture of lubricating oil from untreated mineral lubricating oil stock the method of separating therefrom lubricating fractions of high viscosity index comprising mixing with the oil a solvent liquid composed of liquid sulphur dioxide and amyl alcohol of from 241° F. to 277° F. boiling temperature, cooling the mixture, settling to form an upper and a lower layer, removing the lower layer composed of heavy gravity low viscosity index constituents, further mixing the upper layer with solvent liquids mixed in a proportion to each other and to the oil adapted to separate the oil into fractions of desired viscosity index and, separating from the mixture fractions which require no subsequent acid treatment.

2. The method of manufacturing low pour test lubricating oil of high viscosity index from wax-bearing mineral oil comprising mixing with the oil a solvent liquid composed of liquid sulphur dioxide and amyl alcohol of from 241° F. to 277° F. boiling temperature mixed in such proportion to each other and to the oil that upon chilling to around 0° F. and removing the precipitated wax and the solvent liquids the oil has a pour test of 0° F. or below, chilling the mixture to precipitate wax constituents and removing the wax thus precipitated, mixing additional liquid sulphur dioxide with the dewaxed mixture while cold to separate undesired constituents of low viscosity index, removing the separated constituents, and further mixing the remaining oil with the solvent liquids mixed in a proportion to each other and to the oil adapted to separate the oil into fractions of desired viscosity index, and separating the resulting fractions.

3. The method of manufacturing low pour test lubricating oil of high viscosity index from wax-bearing mineral oil comprising mixing with the oil a solvent liquid composed of liquid sulphur dioxide and amyl alcohol, the alcohol boiling from 241° F. to 277° F. and, being in the predominant proportion, chilling the mixture to a temperature around 0° F. or below to precipitate wax constituents, removing the precipitated wax constituents, mixing further solvent liquid with the dewaxed mixture and increasing the concentration of liquid sulphur dioxide to separate undesired constituents of low viscosity index, removing the separated constituents, and further mixing the remaining oil with additional quantities of the solvent liquids mixed in a proportion to each other and to the oil adapted to separate the oil into fractions of desired viscosity index, and separating the resulting fractions.

4. In the manufacture of low pour test lubricating oil from wax-bearing mineral oil, the method of separating wax constituents therefrom which comprises mixing with the wax-bearing oil a solvent liquid mixture composed of liquid sulphur dioxide and amyl alcohol of 241° F. to 277° F. boiling temperature, mixed in such proportion to each other and to the oil that upon chilling to around 0° F. or below and removing the precipitated wax and the solvent liquids the oil has a pour test substantially of the order of 0° F. and below, chilling the mixture to precipitate the wax constituents, and separating the wax thus precipitated.

5. In the manufacture of low pour test lubricating oil from wax bearing mineral oil the method of separating the wax constituents therefrom which comprises mixing with the wax bearing oil a solvent liquid mixture composed of about one part of liquid sulphur dioxide and three parts of amyl alcohol boiling from 241° F. to 277° F. and in the proportion of about three parts of solvent liquid mixture to one part of oil, chilling the mixture to a temperature of 0° F. and below to precipitate the wax constituents, and separating the wax thus precipitated from the cold mixture.

6. The method of manufacturing low pour test lubricating oil of high viscosity index from wax-bearing mineral oil comprising mixing with the oil a solvent liquid composed of liquid sulphur dioxide and a commercial amyl alcohol mixture boiling from about 241° to 277° F., the alcohol being in the predominant proportion, chilling the mixture to a temperature around 0° F. or below to precipitate wax constituents, removing the precipitated wax constituents, mixing further solvent liquid with the dewaxed mixture and increasing the concentration of liquid sulphur dioxide to provide a solvent mixture containing around 50% to 60% sulphur dioxide, forming an extract phase containing low viscosity index constituents dissolved in the solvent liquid and a raffinate phase comprising high viscosity index oil, separating the two phases, and removing the solvent therefrom.

FRANCIS X. GOVERS.